United States Patent [19]
Johnson et al.

[11] Patent Number: 5,444,451
[45] Date of Patent: Aug. 22, 1995

[54] PASSIVE MEANS FOR SINGLE SITE RADIO LOCATION

[75] Inventors: Richard L. Johnson; Q. Robert Black, both of San Antonio, Tex.; Allan G. Sonsteby, State College, Pa.

[73] Assignee: Southwest Research Institute, San Antonio, Tex.

[21] Appl. No.: 242,699

[22] Filed: May 13, 1994

Related U.S. Application Data

[63] Continuation of Ser. No. 906,528, Jun. 29, 1992, abandoned.

[51] Int. Cl.⁶ ............................. G01S 3/02; G01S 3/16
[52] U.S. Cl. ...................................... 342/453; 342/378
[58] Field of Search ............... 342/378, 387, 417, 445, 342/196, 421, 453; 364/569

[56] References Cited

U.S. PATENT DOCUMENTS

| | | | |
|---|---|---|---|
| 3,936,829 | 2/1976 | Overbury | 342/398 |
| 4,169,245 | 9/1979 | Crom et al. | 342/378 |
| 4,604,717 | 8/1986 | Kaplan | 342/387 |

Primary Examiner—Gregory C. Issing
Attorney, Agent, or Firm—Gunn & Associates

[57] ABSTRACT

The invention described herein relates generally to the field of direction finding and source location. The invention has broad application in areas requiring super-resolution spectral analysis. The invention described in the context of any array processing problem in which the location of a transmitter is to be determined at a single receiving site based on passive measurements of the propagation waveform. The invention exploits the information received by a pair of sensors to extract intersensor delay and interpath delay times in the presence of multipath propagation. Two sensors are used in order to normalize the effects of signal modulation. Combining the sensor pairs in groups, the direction-of-arrival may be determined for each signal from the intersensor delay times thus derived. The invention additionally provides for the estimation of transmitter location by using the intersensor and interpath delay times. The invention is applicable in the context of array data processing to a number of areas including sonar, broadcast, communication, radar and satellite signal formats.

10 Claims, 3 Drawing Sheets

PASSIVE MEANS FOR SINGLE SITE RADIO LOCATION

This application is a continuation of application Ser. No. 07/906,528, filed Jun. 29, 1992 now abandoned.

BACKGROUND OF THE DISCLOSURE

One of the earliest schemes used to locate a radio transmitter was through the use of a network of direction finding (DF) receivers which produce lines of bearing at each site. The geographical location of the transmitter is estimated through triangulation and this technique is in widespread use at the present time. During the 1960's, a new technology was developed to locate a radio transmitter at a single receiving site. The initial step in the single site radio location (SSL) process is to estimate the angle-of-arrival (AOA) of the radio signal at one receiving site, the AOA being characterized by azimuth and elevation. In the case of HF (2-30 MHz) communication, the next step is to estimate the height of the ionospheric reflecting layer, which is typically accomplished by a vertical or oblique incidence sounding. The distance to the transmitter is computed using the estimated elevation of the AOA and ionospheric height. Transmitter location is then determined from the estimated azimuth AOA and distance (or range).

Figure 1:
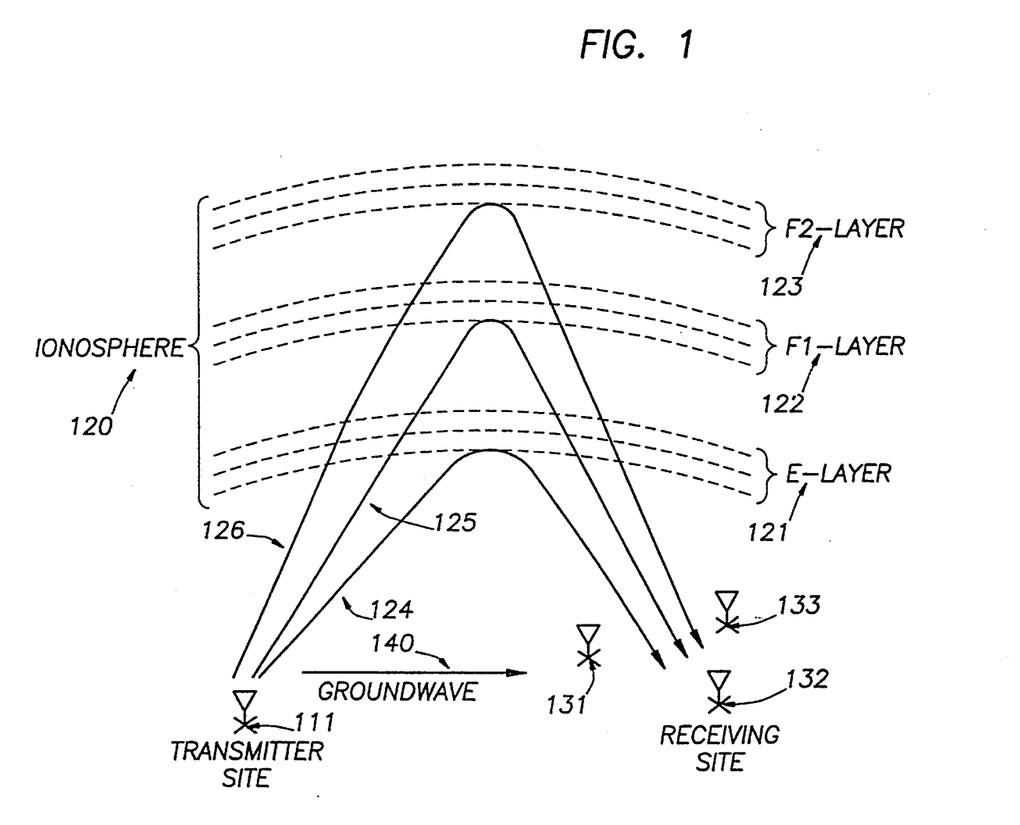
FIG. 1 is a graphical illustration of groundwave and skywave reflections from ionospheric layers for signals propagating from a transmitter site to a receiving site.

As illustrated in FIG. 1, a major source of error in conventional SSL technology is the identification of the propagation path between the transmitting 110 and receiving sites 130. In the case of HF communication, one must consider the propogated wave reflection at layers of different density and different altitudes within the ionosphere 120, the most common being designated as E 121, $F_1$ 122 and $F_2$ 123. If it is assumed that the signal propagated along path 124 via the E 121 layer, when in fact propagation occurred along path 125, via the $F_1$ 122 layer, the error in range estimate could be 100% or greater.

One object of this invention is to provide a means for resolving the issue of mode identification through passive measurements on the received signal and to significantly reduce location errors which result from misidentification of the propagation mode. A propagation phenomenon which routinely occurs in HF communication is that of multipath propagation. In the case of multipath, the signal may propogate from the transmitter 110 to the receiver 130 via two or more signal paths simultaneously, say path 124 and path 125, or path 125 and path 126, or all three paths 124, 125 and 126. In the case of multipath propagation, the wavefield at the receiving site 130 will be a superposition of the component waves arriving via signal paths 124, 125 and 126, for example. At the receiving site 130, this is generally referred to as a multicomponent wavefield. Consideration of multipath propagation represents an important distinction between the invention described in this disclosure and previous inventions. In previous disclosures it was generally assumed that the signal propagated between the transmitter and receiver along a single path. In this disclosure it is assumed that the signal propagates between the transmitter and receiver along two or more signal paths so that the signal observed at one of the receiving antennas 131, 132 or 133, contains a component arriving via a shorter length path 124 plus one or more echoes arriving via a shorter length path 124 plus one or more echoes arriving via a longer length path 125 and/or 126. In this invention the presence of the echoes is exploited, while in previous disclosures the echoes are either ignored or assumed not to exist.

In contrast to the conventional SSL technique, multipath propagation through the ionosphere can be exploited to accomplish passive location without requiring ionospheric height data. The invention described herein is a means to accomplish passive SSL by sampling the received signal at two or more antennas and to estimate the intersensor and interpath delay times. Intersensor delay is defined to be the time difference of arrival (TDOA) for a signal to arrive at receiving antenna 131 and antenna 132, say, or the difference between antennas 131 and 133. Clearly, the intersensor TDOA will be dependent upon the AOA of the signal relative to the spatial positioning of the antenna pair. The interpath delay is the differential transient time for a signal to propagate between the transmitter 110 and receiver 130 along, say, paths 124 and 125. Interpath delay time will be dependent upon the differential path length of the two signal paths and the velocity of propagation. If the path length 124, 125 and 126 are long relative to the spacing between receiving antennas 131, 132 and 133, then the interpath delay time observed at each receiving antenna will be essentially the same value. Stated another way, the time between echoes due to multipath as observed at each receiving antenna will be the same.

The intersensor and interpath delays are used to compute the location of the transmitter. To illustrate the one aspect of the technique, assume that a signal is propagating from the transmitting site 110 to the receiving site 130 along paths 124 and 126, simultaneously. Let receiving antenna 131 be a time reference for arrival so that the intersensor delays at antennas 132 and 133 can be determined for the E 121 components and the $F_2$ 123 component. Thus for the E 121 wave, there is a intersensor delay between antennas 131 and 132, likewise an intersensor delay exists between antennas 131 and 133. Because a line drawn between antennas 131 and 132 is oriented differently from a line drawn between antennas 131 and 133, there are two independent measurements of intersensor delay for the E-layer 121 wave. The two intersensor delays can be expressed as two simultaneous equations involving two unknowns and solved for the azimuth/elevation AOA of the E layer wave. Similarly, for the $F_2$ 123 wave, intersensor delays between antennas 131 and 132 and antennas 131 and 133 can be used to solve for ezimuth/elevation AOA appropriate for signal path 126.

The interpath delay between signal paths 124 and 126 may be estimated using an arbitrary pair of receiving antennas, say 131 and 132, and may be accomplished concurrent with the estimation of intersensor delay times. To solve for the location of the transmitter 110, the data measured at the receiving site 130 are used in concert, namely, the azimuth/elevation AOA of the path 124, the azimuth/elevation AOA of path 126 and the differential path length between paths 124 and 126 (computed from the interpath delay time and an assumed velocity of propagation). It is assumed that the launch angle of each signal path at the transmitter site 110 is the complement of the AOA observed at the receiving site 130. Further, it is assumed that the propagation is one hop skywave (as opposed to two hop skywave with an intervening ground reflection). Moreover, it is assumed that the reflection at the path midpoint obeys Snell's Law. If the transmitter 110 is located in close proximity to the receiver 130 so that a fiat earth model may be used, the solution for the location of the transmitter may be obtained in closed form. If the transmitter 110 is located at considerable distance from the receiver 130 so that a spherical earth model must be employed, then the solution for the location of the transmitter 110 results in a transcendental equation usually be solved iteratively.

In the preferred embodiment which is described in detail below, an example will be given utilizing crossed loop antennas deployed at multiple locations in a common plane. The several antennas thus cooperate to provide AOA information which is processed with the cooperative receiver system to provide delineation between layer reflections in the ionosphere so that errors based on incorrect determination of the ionospheric reflection are avoided.

SUMMARY OF THE INVENTION

The invention described herein is an alternative method of single site radio location which is designed to estimate a fix for a radio transmitter based on passive measurements of the received signal. The basic aspects of the invention include:

1. The subject matter of the invention provides a means to decompose a multicomponent wavefield and to obtain an AOA for each constituent signal.
2. The invention provides a means for extracting the interpath delay times associated with multipath propagation.
3. The invention provides a means for estimating transmitter location on the basis of passive measurements on the received signal at a single site.
4. Since the location technique requires no assumption regarding reflected height of the signal reflection, the invention provides a means for significantly reducing location errors due to misidentified propagation mode.

The sensor array for the invention can be a crossed baseline interferometer, a circularly disposed antenna array (CDAA) or any conventional radio direction finding array. In the preferred embodiment which will be set forth, crossed loop antenna are deployed to form a crossed baseline inteferometer. In the preferred method, the method is implemented as follows:

1. Receive the transmitted signal at multiple antennas, for this implementation, four antennas are considered each of which is input to an RF input to a preamplifier. The output of each preamplifier is applied to the input of a receiver for down conversion to IF (455 KHz). Each circuit consisting of antenna, preamplifer, receiver, and IF filter is referred to as a channel.
2. Simultaneously sample the output of the receiver IF (455 KHz) at a 28.888 KHz rate. The undersampling performs a conversion to baseband (0–14.444 KHz).
3. Apply a window function and compute a descrete Fourier transform (DFT) for the sampled data in each channel.
4. Threshold edit the spectral decomposition to identify frequencies which are propagating signal energy.
5. Use the antennas in a pairwise manner to compute a normalized cross power spectrum for each pair of DFTs (considering those frequency bins determined in step 4). This results in four complex numbers for each frequency bin. Actually there are six possible combinations of antenna pairs; however, only four different pairs were used in this embodiment.
6. Identify the frequency bins in which the magnitude of all four complex numbers is near unity. Using these frequency bins compute spectral cross correlation matrices, one for each antenna pair.
7. For each spectral cross correlation matrix, apply an eigen spectrum estimation technique to estimate the intersensor and interpath delay times. If there are two propagation paths, then the result will be two intersensor delay times and one interpath delay for each spectral cross correlation matrix analyzed (four in this case). Each of the interpath delay estimates should nearly agree in value. If there are three propagation paths then the result will be three intersensor delay times and two interpath delay times for each matrix analyzed.
8. Using the shortest intersensor delay time from each of the four antenna pairs, compute the azimuth elevation AOA of the highest angle (elevation) arriving signal path. Using the next shortest intersensor delay time from each of the four antenna pairs, compute the azimuth/elevation AOA of the next lower angle arriving signal path. This process is repeated for all intersensor delay times. (This procedure assumes all paths are arriving from the same azimuth, for the generalized case see Johnson and Miner, 1991.
9. Assume a geographical location for the transmitter. Using the azimuth/elevation AOA for each signal path, compute the total path length and the differential path length between the paths. Using the estimated interpath delay times from step 7, estimate the differential path lengths. If the two predictions of differential path lengths agree, then the assumed location is the true transmitter location. If the two predictions do not agree, choose another location and repeat step 9.

The invention and its objects and features are more readily apparent from the following example and appended claims after development of the theory set out in the specification.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The theory applied to passive SSL will become apparent from the following detailed description. Consider a signal propagation environment as illustrated in FIG. 1. In particular, consider a transmitted signal propagating via a groundwave 140 and an ionospherically reflected E layer skywave (path 124) which is received by three spatially separated antennas 131, 132 and 133 (although the multipath geometry is completely arbitrary, a groundwave/skywave combination occurs often and was chosen for illustration). The transmitted signal from site 110 is characterized as s(t), the interpath delay time is denoted $\tau_g$. In general $\tau_g$ will have a different value for the antenna pair 131 and 132 versus the pair 131 and 133. The intersensor delay time for the skywave 124 between antennas 131 and 132 or 133 is denoted $\tau_g$. The signals received at antennas 131 and 132 (for example), may be expressed as:

$$x_{131}(t) = A_g s(t) + A_s s(t - \tau_m) \qquad (1a)$$

$$x_{132}(t) = A_g s(t - \tau_g) + A_s s(t - \tau_s - \tau_m) \qquad (1b)$$

where $A_g$ denotes the group path attenuation for the groundwave 140, and $A_s$ the attenuation for the skywave path 124. If $F(\omega)$ denotes the Fourier transform of $s(t)$, then the Fourier transform of $x_{131}t$ and $x_{132}t$ may be represented as:

$$F\{x_{131}(t)\} = F_{131}(\omega) = [A_g + A_s e^{-j\omega\tau_m}] \cdot F(\omega) \qquad (2a)$$

$$F\{x_{132}(t)\} = F_{132}(\omega) = [A_s e + A_s e^{-j\omega\tau_m} + A_s e^{-j\omega(96s + \tau_m)}] \cdot F(\omega) \qquad (2b)$$

The normalized cross power spectrum between receiving antennas 131 and 132 is given by:

$$S_{12}(\omega) = \frac{F_{131}(\omega) F_{132}(\omega)}{\sqrt{|F_{131}(\omega)|^2 \cdot |F_{132}(\omega)|^2}} \qquad (3)$$

The normalization is applied to reduce the effects of signal modulation. To express the normalized cross power spectrum in polar form, the notation is simplified by defining $A_{131}$ and $A_{132}$ as:

$$A_{131} = A_g + A_s e^{-j\omega\tau_m} \qquad (4a)$$

$$A_{132} = A_s e^{-j\omega\tau_g} + A_s e^{-j\omega(\tau_{as} + \tau_m)} \qquad (4b)$$

The normalized cross power spectrum may alternately be expressed as:

$$S_{12}(\omega) = \frac{|A_{131}A_{132}^*| \cdot \arg(A_{131}A_{132}^*) \cdot |F(\omega)|^2}{\sqrt{[A_{131}A_{132}^*|F(\omega)|^2] \cdot [A_{131}A_{132}^*|F(\omega)|^2]}} \qquad (5a)$$

$$S_{12}(\omega) = Arg(A_{131}A_{132}) = e^{j\phi(\omega)} \qquad (5b)$$

$$\phi(\omega) = \tan^{-1}\left| \frac{A_g^2 \sin\omega\tau_g + 2A_g A_s \cos\frac{\omega}{2}(2\tau_m + \tau_s)\sin\frac{\omega}{2}(\tau_g + \tau_s)}{A_g^2 \cos\tau_g + A_g^2 \cos\omega\tau_s + 2A_g A_s \cos\frac{\omega}{2}(2\tau_m + \tau_s - \tau_g)\cos\frac{\omega}{2}(\tau_g + \tau_s)} \right|$$

As a result of the normalization process, the cross power spectrum has unity magnitude and is characterized by a complex argument which has a period determined by the intersensor delays and the interpath delay. The amplitude of the periodicity is a function of the relative amplitudes $A_g$ and $A_s$ of the two propagation paths 140 and 124. To estimate the intersensor and interpath delay times, one must accomplish a spectral decomposition of the cross power spectrum, and to do this, an eigen superresolution technique is applied. The eigen method is employed because the signals of interest are generally contained in a narrow bandwidth, and as a consequence, the number of periods which can be observed is usually restricted. Also the estimate of cross power spectrum is generally contaminated by noise and may be expressed as:

$$S_{12} = e^{j\phi(107)} + N(\omega) \qquad (6)$$

where $N(\omega)$ may be a complex expression involving (signal×noise) and (noise×noise) terms. In this development, the case of additive white Gaussian noise which is uncorrelated with the signal components is considered. The proceeding development dealt with a generalized theory of Fourier analysis, and in the following, the theory is applied to the case of a discrete Fourier transform or to the fast Fourier transform (FFT) in particular.

Consider the situation in which the time series at each of the receiving antennas 131 and 132 is sampled and an FFT is computed for each antenna output. For each frequency bin which contains signal power, a normalized cross power spectrum defined by Equation (6) is computed. If the signal energy were spread over M frequency bins say $\omega_1, \omega_2, \ldots \omega_m$, then the result would be:

$$S_{12} = \begin{vmatrix} e^{j\phi(\omega_1)} \\ e^{j\phi(\omega_2)} \\ e^{j\phi(\omega_n)} \end{vmatrix} + \begin{vmatrix} N(\omega_1) \\ N(\omega_2) \\ N(\omega_m) \end{vmatrix} \qquad (7)$$

Using the conventional outer product definition, the spectral cross correlation matrix is formed as:

$$C(\omega) = E\{S(\omega)S^H(\omega)\} \qquad (8)$$

where $E\{\ \}$ is the statistical expectation and H denotes conjugate transpose. The elements of the C matrix are given as:

$$C_{ij}(\omega) = E\{[e^{j\phi(\omega i)} + N(\omega_j)]$$

$$[e^{-j\phi(\omega j)} + N^*(\omega_j)]\} = e^{j[\phi(\omega i) - \phi(\omega j)]} + \sigma^2\delta(\omega_i - \omega_j) \qquad (9)$$

In order to estimate the delay times, a spectral decomposition of the C matrix is performed using an eigen superresolution technique.

To apply to eigen algorithm, the spectral cross correlation matrix C is formed and an eigen decomposition is computed. The general eigen problem is defined as $Cx = \lambda Nx$, where C is the spectral cross correlation matrix defined by Equation (8). The matrix N is the noise matrix also defined by Equation (8) and generated when the transmitter 110 is off, or by making corresponding measurements in an adjacent frequency passband which does not contain the signal of interest. To solve the generalized eigen problem one finds the roots of $(C - \lambda N)x = 0$, where $\lambda$ represents the generalized eigenvalues and x represents the generalized eigenvectors. If the noise background is white Gaussian, then the spectral cross correlation matrix composed of noise only, will be the identity matrix and $N = I$. In this case the eigen equation becomes $(C - \lambda I)x = 0$. Standard software is available to solve this problem such as EISPACK or LINPACK. The eigenvalues are ordered in monotonically decreasing order as $\lambda M \geq \lambda M - 1 \ldots \geq E1$. To determine the rank of the matrix $C_E$ the matrix is successively partitioned by eliminating corresponding rows and columns until the determinate of the remaining partition does not equal zero. If all rows and columns are eliminated, save the dirst element $C_{11}(\omega)$, then the matrix is rank one and the wavefield is assumed to consist of two coherent paths. If all rows and columns are eliminated except the first two (the result is a 2×2 matrix), then the matrix is rank two and the wavefield is assumed to consist of two pairs of coherent paths (or four total paths). For the case of two coherent paths, $C_E$ will be rank one, and will have a nullspace of dimension $M-1$. The signal paths 140 and the 124 would be mutually coherent if the E layer were stable and not changing in height. On the other hand, the signal paths 140 and 124 could be mutually incoherent if the E layer were fluctuating rapidly in height so that path length 124 would be changing rapidly. In general the rank of $C_E$ will depend upon the number of coherent paths pairs. Consider the case of four propagation paths shown in FIG. 1. If paths 140 and 124 were mutually coherent and paths 125 and 126 were mutually coherent, but 140-124 and 125-126 were mutually incoherent, then $C_E$ will be rank two with a null space of $M-2$. When three or more mutually coherent paths are present the approach must be generalized, and that situation is considered later in this section. For one pair of interfering paths, the nullspace matrix is given as $C_N = [E_{M-1} E_{M-2} \ldots E_1]$, and the eigen spectrum is computed as:

$$P = (B^H C_N C^H_N B)^{-1} \quad (10)$$

where B is the "steering vector" defined as:

$$B = \begin{vmatrix} \exp\{j\phi(\omega_1)\} \\ \exp\{j\phi(\omega_2)\} \\ \exp\{j\phi(\omega_m)\} \end{vmatrix} \quad (11)$$

and the complex argument argument $\phi(\omega_i)$ is given by Equation (5c). The essential procedure for computing the delay times is to search for the peaks of Equation (10). If the amplitudes are normalized, the search is through a four dimensional space, namely $A_g/A_s$, $\tau_g$, $\tau_s$, and $\tau_m$. To illustrate how the maximum of the eigen spectrum results in an estimate of both the intersensor and inter path delay times (and the amplitude ratio as well!), it is noted that the vector B of Equation (11) is defined by the four parameters above. It is recalled that the inner product of two vectors is defined as $C^H B$ and if the two vectors are orthogonal (i.e. perpendicular), then $C^H B = 0$. It is noted that each column of the matrix $C_N$ is a vector, and the vectors $E_{M-1} \ldots E_1$ define the null space. Therefore, we want to construct the vector B so that it is orthogonal to the null space vectors E, that is $E^H_{M-1} B = E^H_1 B = 0$. Stated another way, we want to determine $A_g/A_s$, $\tau_g$, $\tau_s$, and $\tau_m$. such that $C^H_N B = 0$. This occurs when all four parameters assume their true values simultaneously, since they are all required to characterize the vector B. However, as a practical matter, we may never realize the true value of B, and we enhance the peak, using the square of the inner product instead, that is $(C^H_N B)H (C^H_N B) = B^H C_N C^H_N B$. Thus we define the eigen spectrum as the inverse square of the inner product of the null space $C_N$ and the vector B and we observe that a maximum of the eigen spectrum occurs when B is most nearly orthogonal to the null space or when the delay parameters simultaneously approach their true value.

If the signal propagates from the transmitting site 110 to the receiving site 130 via three mutually coherent paths 124, 125 and 126, then Equations (4a) and (4b) must be extended to three paths as opposed to two paths. In the following the general case of q paths is considered. The amplitude of the ith path is denoted as $V_1$, and the delay between antennas for the ith path as $\tau_1$. Arbitrarily choosing path 1 as reference, the inter-path delay time between path i and path 1 is characterized as $\tau_{11}$. Equations (4a) and (4b) may be generalized as, $$A_{131} = \sum_{i=1}^{q} V_i e^{-j\omega \tau_{1i}} \quad (12a)$$

$$A_{132} = \sum_{i=1}^{q} ie^{-j\omega(\tau_{1i} + \tau_i)} \quad (12b)$$

where $\tau_{ii} = 0$. The phase function of the normalized cross power spectrum corresponding to Equation (5c) is given by:

$$\phi(\omega) = \tan^{-1} \left[ \frac{\sum_{j=1}^{q} \sum_{i=1}^{j} k(i,j) \, v_i v_j \sin \frac{\omega}{2} (\tau_1 + \tau_j) \cos \frac{\omega}{2} (2\tau_{ij} - \tau_1 + \tau_j)}{\sum_{j=1}^{q} \sum_{i=1}^{j} k(i,j) \, v_i v_j \cos \frac{\omega}{2} (\tau_1 + \tau_j) \cos \frac{\omega}{2} (2\tau_{ij} - \tau_i + \tau_j)} \right] \quad (13)$$

Equation (12) is used to generate the array steering vector used in Equations (9) and (10). In the case of three paths, the eigen spectrum will involve a search over seven variables, namely $V_2/V_1$, $V_3/V_1$, $\tau_1$, $\tau_2$, $\tau_3$, $\tau_{12}$, and $\tau_{13}$.

Consideration is directed to the example cited with reference to FIG. 1 and the groundwave signal path 140 and the E layer path 124. From the solution of Equations (10) and (11) for the receiving antenna pair 131 and 132, one obtains $A_g/A_s, \tau_g$, and $\tau_m$. Likewise, applying Equation (10) and (11) to the data received at antenna pair 131 and 132, one can obtain $A'_g/A'_s$, $\tau'_g, \tau'_s$, and $\tau'_m$. Generally, $A_g/A_s = A'_g/A'_s$ and $\tau_m = \tau_m'$ but $\tau_g \neq \tau'_s$ and $\tau_s \neq \tau_s'$. The equality conditions may be used as a consistency test to validate the solution. The intersensor delay times are used to estimate the azimuth/elevation AOA for each constituent signal in the multicomponent wavefield.

Consider the receiving antenna pair 131 and 132. The location of the antennas are quantified in an (x,y,z) coordinate system. Let antenna 131 be located at (0,0,0) and antenna 132 be at arbitrary coordinates (x,y,z). Similarly, let antenna 133 be situated at coordinates (x'y',z') The azimath/elevation AOA for signal path 140 is denoted $\Theta_g$, $\psi_s$. respectively. Likewise the azimuth/elevation AOA for signal path 124 is denoted. The intersensor delay times are given as, $$\tau_g = (x \sin \theta_g \cos \Psi_g + y \cos \theta_g \cos \Psi_g + z \sin \Psi_g)/c \quad (14a)$$

$$\tau'_g = (x' \sin \theta_g \cos \Psi_g + y' \cos \theta_g \cos \Psi_g + z' \sin \Psi_g)/c \quad (14b)$$

$$\tau_s = (x \sin \theta_s \cos \Psi_s + y \cos \theta_s \cos \Psi_s + z \sin \Psi_s)/c \quad (14c)$$

$$\tau'_s = (x' \sin \theta_s \cos \Psi_s + y' \cos \theta_s \cos \Psi_s + z' \sin \Psi_s)/c \quad (14d)$$

where c is the velocity of propagation, generally assumed to be $3 \times 10^8$ meters/second. Equations (14a) and (14b) can be solved simultaneously for $\theta_g$ and $\Psi_g$. Similarly Equations (14c) and (14d) can be solved simultaneously for $\theta_g$, $\Psi_s$.

Using both of the AOA ($\theta_g$, $\Psi_g$) and $\theta_s$, $\Psi_s$ with the interpath delay time. $_{-\tau_m, \tau'_m}$, or $(\tau_m + \tau'_m)/2$, the location of the transmitting site 110 can be determined. In this example, it is assumed that $\tau_m = \tau'_m$. The differential path length $\Delta L$ better signal paths 140 and 124 is given as $$\Delta L = c \tau_m \quad (15)$$

Figure 2:
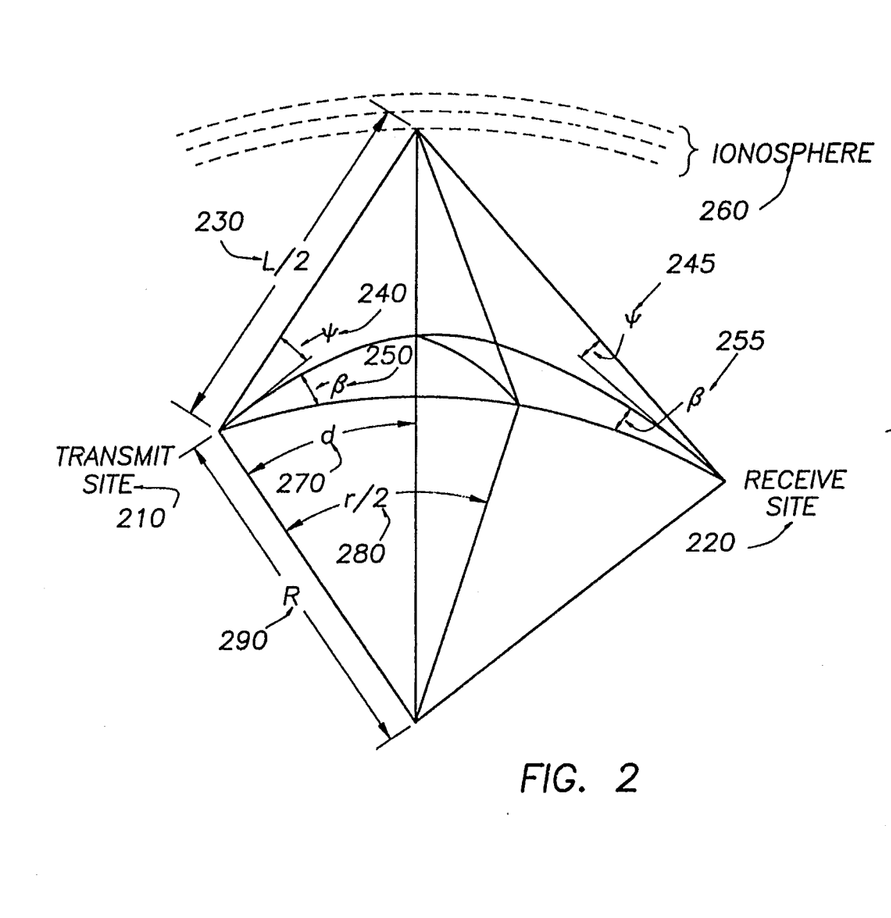
FIG. 2 illustrates the geometry used to predict path length from the azimuth and angle of arrival.

The geometry used to predict propagation path length from the azimuth/elevation AOA is illustrated in FIG. 2. The latitude/longitude coordinates of the receiver site 220 are known. Consider an arbitrary point on the earth's surface as a candidate location for the transmitter site 210. To compute the path length 230, three assumptions are made: (1) the launch angle of the signal at the transmitter site 210 is the compliment of the AOA at the receiver site 220; (2) the signal reflection from the ionosphere 260 obeys Snell's Law; and (3) the propagation path is composed of, at most, one hop.

Using the latitude and longitude of the candidate transmit site 210, the azimuth of the great circle bearing between transmitter 210 and receiver 220 may be computed, denote this quanitity $\phi$. At the receive site 220 the quantity $\beta$ is given as $\phi - 0$, or the off-path propagation angle. Thus, the azimuth launch angle at the transmitter site 210 must be receprocal bearing of $\phi$ and adjusted by an amount $\beta$. For example, if the AOA at the receive site is $\beta$ degrees to the North, then the launch angle at the transmitter site 210 must be $\beta$ degrees to the North. If the observed elevation angle 245 is $\psi$ at the receive site 220, then the elevation angle 240 of launch at the transmit site 210 must also be $\psi$, due to assumption (1) above. Let R denote the earths radius (generally assumed to be 6370 Km), d denotes the ground distance between the transmitter 210 point below the inospheric reflection, and let r denote the great circle distance between transmitter 210 and receiver 220. This results in $$L' = \frac{2R \sin \frac{d}{R}}{\cos \left( \frac{1d}{R} + \psi \right)} \quad (16a)$$

$$d = \tan^{-1} \left( \frac{\tan \frac{r}{2}}{\cos \beta} \right) \quad (16b)$$

If equations (16a) and (16b) are applied to both the groundwave and skywave paths, then a second estimate of $\Delta L$, say $\Delta L'$. is obtained for the differential path length between signal paths 140 and 124 of FIG. 1. The solution for transmitter location proceeds as follows: (1) use equation (15) to estimate differential path length $\Delta L$ based on interpath delay time, (2) compute L' for each of the estimated AOAs, i.e. $(0_g, \psi_g)$ and $(0_s, \psi_s)$, (3) subtract the two to compute $\Delta L'$., and (4) choose candidate transmitter locations (repeating steps 2-3) until $$|\Delta L - \Delta L'|^2 = 0 \quad (17)$$

or is less than some acceptable minimum value. This is a least squares minimization problem and a number of techniques are available to efficiently carry out the process.

Figure 3:
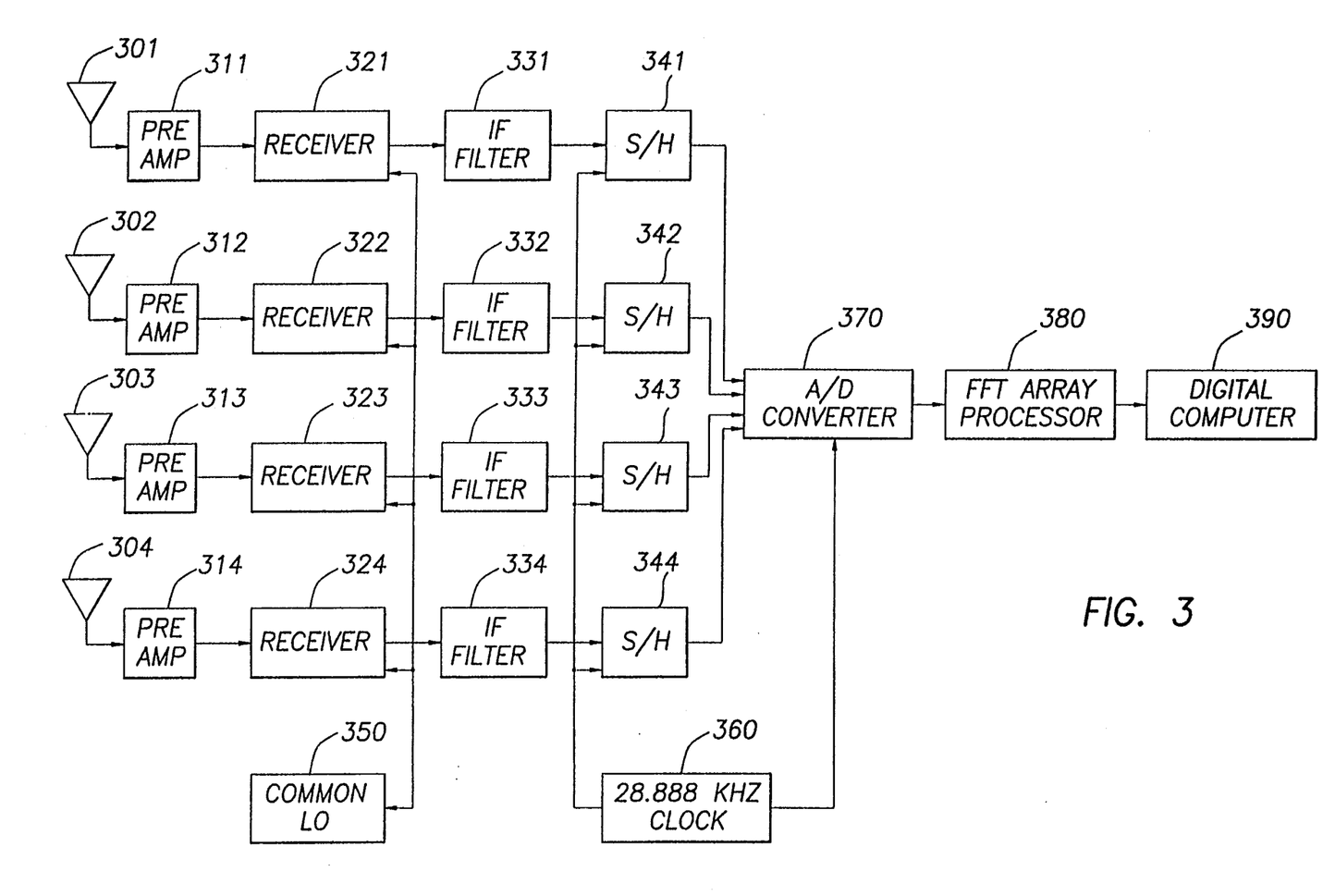
FIG. 3 shows the receiving apparatus according to the present invention.
Figure 4:
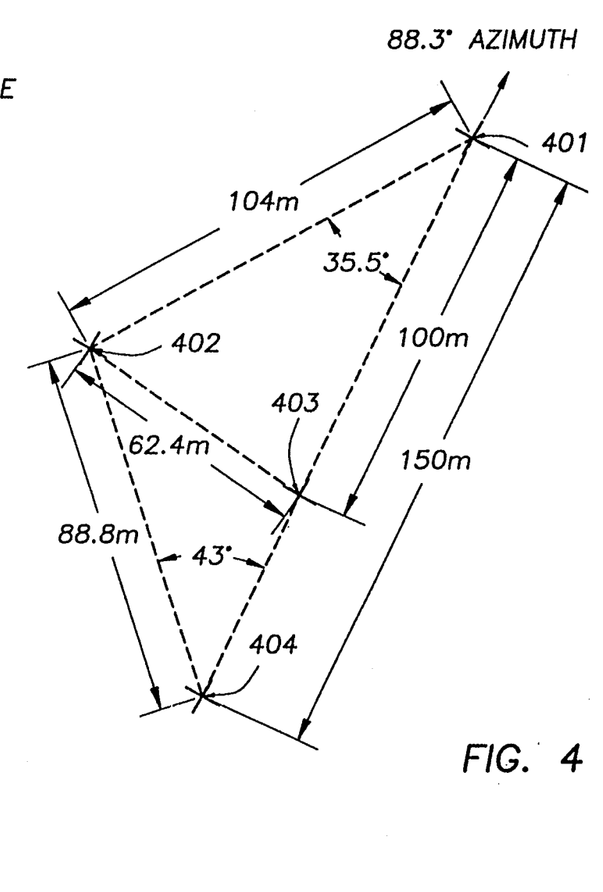
FIG. 4 illustrates the deployment of four receiving antennas in an array and is used as an example in the preferred embodiment.

FIG. 3 illustrates the receiving apparatus in accordance with the present invention. The antennas were deployed as shown in FIG. 4. Fourt crossed loop antennas were located at positions marked 401 through 404, and the diameter of each loop was 1.524 m (60 in). The four baselines used to compute interpath and intersensor delay times were 401-402 (2.9λ), 401-404 (4.2λ), 402-403 (1.7λ) and 402-404(2.5λ). A multitone frequency shift keyed (FSK) modulated signal was transmitted which filled the 3 KHz passband of the receivers. As shown in FIG. 3, the output of each of the antennas (301-304) was applied to broadband preamplifiers (311-314). The bandwidth of the preamplifiers was 1-30 MHz. The output of the preamplifiers 311-314 through coaxial cables which were matched in gain and phase. The detection of the receivers 321-324 was done coherently through the use of a common local oscillator 350 to maintain phase coherence. The IF stages of the receivers had been replaced with gain/phase matched filters 331-334 to maintain ±3° phase match and ±5 db gain match between channels. The 455 KHz IF output was applied to sample/hold circuits 341-344 to obtain simultaneous sampling on all four channels. The sample/hold circuits 341-344 were applied to analog/digital converter 370 for digitizing and subsequent processing by the FFT array processor 380. The sample/hold circuits 341-344 and analog/digital converter 370 were synchronized through the use of a 28.888 KHz clock 360. Thus, each receiver channel was sampled at a rate of 28.888 KHz which resulted in an unaliased bandwidth of 14.444 KHz. Since the IF filters 331-334 had a sharp falloff about 3 KHz, this resulted in a guard band of 5.722 KHz above and below the frequencies of interest. The IF signal from each receiver was 3 KHz bandwidth centered about 455 KHz, and the effect of the undersampling at 28.888 KHz was to down convert the 455 KHz component to 7.222 KHz with the passband located ±1.5 KHz either side. The digitized samples from each channel were multiplexed into blocks of 1024 samples each by the A/D converter system 370 and applied to the FFT array processor 380. This resulted in the computation of Fourier transforms similar to equations (2a) and (2b). In particular for each antenna 301–304, a complex FFT of 512 points resulted for each block of 1024 samples. A block of 1024 samples was acquired in 35.45 msec which yielded a spectral resolution of 28.2 Hz. The bins of particular interest were those between 203 and 309 which correspond to 7.222 KHz ±1.5 KHz. Referring to FIG. 3, the normalized cross power spectrum of equation (3) was computed for the antenna pairs (401, 402), (401, 404), (402, 403) and (402, 404).

The frequency bins between 203 and 309 (of 512 total) with a magnitude nearest unity were selected and those bins were used to compute the spectral cross correlation matrix given by equation (8). All processing done subsequent to the FFT is done in the digital computer 390. After the spectral cross correlation matrix is formed, and eigen decomposition is performed using a standard software routine such as EISPACK. The nullspace matrix is formed from the eigenvectors and equation (10) is used to find the maximum of the eigen spectrum which produces the intersensor and interpath delay time estimates.

Since there were two propogation paths present when the system was used, there were two intersensor delay times and one interpath delay path delay time for each pair of antennas (401,402), (401,404), (402, 403) and (402, 404). To obtain the azimuth/elevation AOA, the groundwave intersensor delay times are used to form four simultaneous equations similar to equation (14a) and (14b). Likewise the skywave intersensor delay times are used to form four simultaneous equation similar to equation (14c) and (14d) to compute the skywave azimuth/elevation AOA.

The four interpath delay times are averaged to form a composite estimate of interpath delay and equation (15) is used to estimate the differential path length. Equation (17) is applied to solve for the transmitter location.

The antenna array can be made up of more than the illustrated number of antennas. If five or six antennas are readily available, they can all be used. In that instance, they may be deployed in the same geometric pattern as shown in FIG. 4 or the pattern can be varied. If the relative position and angular spacing of the antennas with respect to each other is different from that of FIG. 4, it is helpful that spacing among the various antennas provide perhaps one or two wavelengths in separation. In other words, it is desirable that the antennas not be immediately adjacent to each other; moreover, they should be spread so that the intersensor delays are of the order of microseconds to permit sufficient numerical resolution in the search for eigen spectrum maximum.

Sampling in the present system occurs at a designated sample rate. Sampling can be increased, but the provision of added data does not make a significant difference so long as the sampling rate is statistically reliable. An increase in sampling rate will aid and assist the provision of data which is reliable in measurement of the time differential.

Perhaps mention ought to be made of the frequency bands or windows. This depends in part on the mode of modulation. Thus, an example was given where FSK modulation was preferred. An alternate approach permits the present system to receive other types of modulated signals such as PCM, CW and so on. Voice transmission, especially that with a suppressed carrier such as single side band transmission, is somewhat more difficult depending on the modulation, but even in that instance, it is possible to get data provided there is sufficient transmitted signal. There maybe momentary lapses, not as a failure of the present apparatus, but as a result of a failure of the modulating signal to provide sufficient frequency content to enable appropriate reception.

Although the invention has been described with reference to a particular embodiment, it will be understood to those skilled in the art that the invention is capable of a variety of alternative embodiments within the spirit and scope of the appended claims.

What is claimed is:

1. A method of measuring the geographical location of a remote transmitter from a single receiver-site comprising the following steps:
   (a) providing an array of signal sensors wherein the sensors are spatially separated to obtain a finite intersensor propagation delay time for transmitted signals incident upon the array and transmitted from a remote transmitter;
   (b) obtaining sampled signals from substantially simultaneous measurements of transmitted signals received at the sensory array;
   (c) determining the discrete Fourier transform (DFT) for the sampled signal at each sensor;
   (d) considering the sensors in pairs and computing a normalized cross power spectrum using DFT for the sample signal acquired at each individual sensor;
   (e) identifying the frequency bins of the normalized cross power spectrum which have magnitudes near unity;
   (f) using the frequency bins of the normalized cross power spectrum which have magnitudes near unity to compute a spectral cross correlation matrix;
   (g) determining by matrix evaluation the rank of said spectrum cross correlation matrix, eliminating a number of columns from the leftmost portion of the matrix equal to the rank of the spectral cross correlation matrix with the remaining matrix being a matrix representative of nullspace;
   (h) forming the eigen spectrum using the nullspace matrix and a sensor array steering vector;
   (i) searching for the maximum of said eigen spectrum which will result in an estimate of the intersensor and interpath delay times; and
   (j) computing the geographic location of the remote transmitter using the intersensor and interpath delay time.

2. The method of claim 1 further comprising the steps of:
   (a) determining the azimuth/elevation angle of arrival (AOA) for each signal present in a multicomponent wavefield using the intersensor delay time;
   (b) estimating the interpath delay time for each pair of coherent multipath signals present in a multicomponent wavefield using the intersensor delay times; and
   (c) then determining the geographic location of the transmitter using the azimuth/elevation AOAs and the interpath delay times.

3. The method of claim 1 wherein:
   (a) mixing with the transmitted signal noise which has a known or measured correlation matrix but which is uncorrelated with the transmitted signal to form a composite cross correlation eigen equation;

(b) isolating the noise component by solution of the composite cross correlation eigen equation;

(c) determining echo time delay resulting from transmitted signal reflections from ionospheric layers;

(d) providing an eigen spectrum method for determining the time difference for transmitted signal arrival at spatially separated sensors;

(e) through the use of the normalized cross power spectrum, determining the frequency components with near unity magnitude to be used for enhanced accuracy in estimating time delay, and (f) determining interpath delay from a single sensor by observing a signal with known modulation characteristics.

4. The method of claim 1 wherein said sensors are arrayed to receive signals arriving from any direction in azimuth and elevation AOA.

5. The method of claim 4 wherein sensors in paired arrangement within the array have different times of arrival resultant from the transmitted signal, and said transmitted signal propagates by way of at least two paths including groundwave and skywave or skywave and a second skywave path dependent on ionospheric conditions.

6. The method of claim 5 wherein said eigen spectrum is defined for a frequency spectrum of a transmitted signal to enable determination of frequency dependent spatial relationships sufficient to resolve azimuth/elevation AOA for each constituent signal of a multicomponent wavefield.

7. The method of claim 1 wherein the said eigen spectrum is determined for a specified frequency spectrum of sufficient width to enable obtaining constituent time delays for each signal in a multicomponent wavefield.

8. The method of claim 7 wherein the remote transmitter is operated with sufficient bandwidth to permit a partitioning into sub-bands so that each sub-band enables the determination of constituents time delays for each component of a multicomponent wavefield.

9. The method of claim 8 wherein components of multicomponent wavefields are used to make multiple estimates of geographic locations of a remote transmitter, each estimate of location being based upon one sub-band of the total bandwidth.

10. A method of determining the location of a remote transmitter as indicated by azimuth and range to said transmitter measured from a receiving antenna array site, which comprises the steps of:

(a) determining at an antenna site the intersensor and interpath delay times of a signal transmitted from a remote transmitter;

(b) computing the azimuth AOA from the ground wave signal path using the intersensor and interpath delay times;

(c) computing the azimuth AOA of the skywave signal path using the intersensor and interpath delay times;

(d) determining the skywave reflection height from an ionospheric sounding;

(e) computing the ground range to the remote transmitter by combining said computed AOA of the skywave and said skywave reflection height;

(f) computing the azimuth of the remote transmitter using said computed groundwave AOA, said groundwave signal path and said skywave signal path; and (g) determining the geographical location of the remote transmitter by combining the ground range and said azimuth of said remote transmitter.

* * * * *